Dec. 1, 1925.

W. B. RICHARDSON 1,563,791

DISTANCE CONTROL ATTACHMENT FOR TRACTORS

Filed April 10, 1924

Inventor
W. B. Richardson
By Marks & Clerk

Patented Dec. 1, 1925.

1,563,791

UNITED STATES PATENT OFFICE.

WILLIAM BETTS RICHARDSON, OF DOCKERS PLAINS, VIA WANGARATTA, AUSTRALIA.

DISTANCE CONTROL ATTACHMENT FOR TRACTORS.

Application filed April 10, 1924. Serial No. 705,679.

*To all whom it may concern:*

Be it known that I, WILLIAM BETTS RICHARDSON, a subject of the King of Great Britain and Ireland, residing at Dockers Plains, via Wangaratta, in the State of Victoria, Commonwealth of Australia, have invented certain new and useful Improvements in Distance Control Attachments for Tractors; and I do hereby declare the following to be a full, clear, and exact description of the invention, such as will enable others skilled in the art to which it appertains to make and use the same.

This invention relates to tractor attachments to allow a tractor to be started, stopped, and steered from a trailer by a driver on the trailer, which may be an agricultural machine which the driver will also control, instead of the two machines requiring two men. My devices do not prevent control of the tractor from the tractor seat if the latter has an occupant, nor do they hamper such movements relatively to one another of the tractor and the trailer as are desirable. The details of my invention will be explained by reference to the accompanying drawings, in which scales vary.

Figure 1:
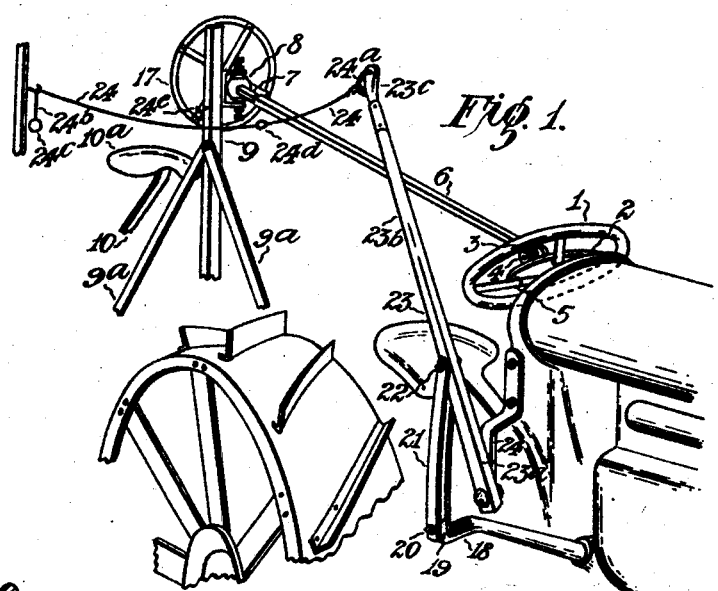
Figure 1 is a perspective view of part of a tractor and part of a trailer with my attachments.
Figure 2:
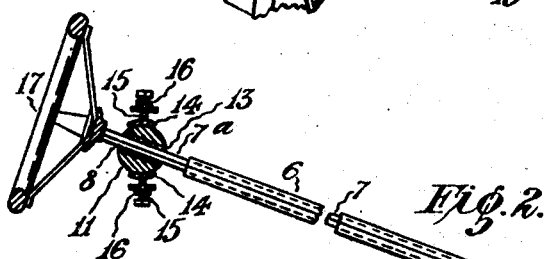
Figure 2 is a side view, partly in section, of my steering connection.
Figure 3:
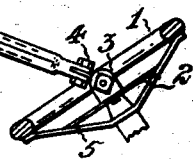
Figure 3 is a sectional view through a bearing containing the rear of my steering rod.
Figure 4:
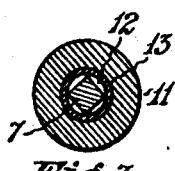
Figure 4 shows part of a clutch pedal connection.
Figure 5:
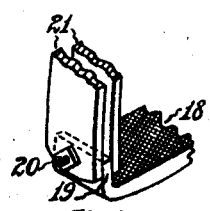
Figure 5 shows the said clutch pedal connection modified.

1 is the tractor steering wheel to which I fix by suitable means a plate 2, which carries a lug 3 to which is attached a joint 4. 5 are clips by which plate 2 is removably attached to the steering wheel spokes.

To joint 4 which is shown of double knuckle type (although a universal joint would function in like manner) I attach a longitudinal member 6 of a telescopic auxiliary steering rod. The longitudinal member 6 slidably engages the fore and middle parts of a longitudinal member 7 of the steering rod, one of these parts being a tube in the case illustrated.

Member 7 at its rear $7^a$ projects through a movable supporting bearing 8, which is mounted on a pillar 9 carried by the trailer. The pillar 9 has stays $9^a$. The bearing 8 contains a spherical rotatable perforated block 11 supported between cups 14 having threaded stems 15 which carry adjustment and locking nuts. The block contains an aperture 12 of circular cross section, and within the said aperture extends the rear part of the longitudinal member or rod 7 which may be rotated freely. The aperture 12 is fitted with a wear-taking sleeve 13. Movements of the trailer 10 due to varying ground surface and varying directions of draught are not duplicated by the bearing and are not necessarily like the movements of the tractor.

The seat $10^a$ of the trailer is at any point convenient to the auxiliary steering wheel 17 which is carried on the rear of rod 7.

The clutch pedal of some forms of tractor is (as shown at 18) provided with a flange 19 to which I connect, by bolt 20, for example, one or more lever links 21, the latter being connected, as by bolt 22 to a lever 23. In cases in which the pedal has no flange 19 I fix an angle bracket $19^a$ thereto as an equivalent.

23 shows a lever which has a relatively short limb $23^a$ which is pivoted to a fulcrum, a bracket 25 being suitable, attached to the tractor frame. The lever has a relatively long limb $23^b$ which has an end $23^c$ having means to receive a shackle $24^a$ at the fore end of a cable or equivalent flexible connection 24. The rear $24^b$ of this cable is shown weighted at $24^c$, and supported on part of the trailer frame.

On cable 24 is an eye or hook $24^d$ in a position to enable the cable to be fixed against pull from either end so that the cable will hold the tractor clutch in disengaged position. I provide to engage the eye or hook $24^d$, a member $24^e$.

When my attachment is not required, it may be removed, but the lever 23 may be left in position, as it may prove useful to enable the tractor pedal to be conveniently controlled.

Modifications of detail may be introduced while retaining the longitudinally adjustable parts of the auxiliary steering rod.

When my invention is in use the adjustable members 6, 7 move telescopically, accommodating themselves to movements of the tractor and trailer relatively to one another, as when the tractor and/or trailer are turning instead of travelling in a straight line. The combined operative length of the members 6, 7, will be from time to time whatever is convenient, according to the trailer and tractor connected, the distance between them varying in practice.

When a driver occupies seat 10ª he will control tractor progress by means of flexible connection 24, lever 23, link device 21, and clutch pedal 18; and he will steer the tractor by using the auxiliary wheel 17 and thus the joint 11, members 6, 7, and joint 4. He will also operate the trailer controls (not shown).

I claim:—

1. Means for controlling the steering wheel of a tractor from a trailer including a socket member, a universal joint connecting the front end of the socket member to the steering wheel of the tractor, a ball mounted for universal movement on the trailer and having a bore, and an auxiliary steering wheel having a rod passing through said bore and extending into the socket, said rod and socket being constructed to turn in unison.

2. Means as claimed in claim 1 including supporting plates bearing against said ball, and means for adjusting said supporting plates vertically.

3. Means as claimed in claim 1 in which the bore of the ball is provided with a tubular lining of cylindrical cross section, the portion of the rod passing through said lining having an angular cross-section.

In witness whereof I have hereunto set my hand.

WILLIAM BETTS RICHARDSON.